(12) United States Patent
Grotendorst et al.

(10) Patent No.: US 9,935,875 B2
(45) Date of Patent: Apr. 3, 2018

(54) FILTERING DATA PACKETS TO BE RELAYED IN THE CAR2X NETWORK

(71) Applicant: Continental Teves AG & Co. oHG, Frankfurt (DE)

(72) Inventors: Thomas Grotendorst, Eschborn (DE); Marc Menzel, Weimar (Lahn) (DE); Richard Scherping, Liederbach am Taunus (DE); Ulrich Stählin, Eschborn (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 107 days.

(21) Appl. No.: 14/911,894

(22) PCT Filed: Aug. 22, 2014

(86) PCT No.: PCT/EP2014/067940
§ 371 (c)(1),
(2) Date: Feb. 12, 2016

(87) PCT Pub. No.: WO2015/025048
PCT Pub. Date: Feb. 26, 2015

(65) Prior Publication Data
US 2016/0197825 A1 Jul. 7, 2016

(30) Foreign Application Priority Data
Aug. 22, 2013 (DE) .......................... 10 2013 216 634

(51) Int. Cl.
*H04L 12/56* (2006.01)
*H04L 12/721* (2013.01)
(Continued)

(52) U.S. Cl.
CPC ............. *H04L 45/70* (2013.01); *G08G 1/093* (2013.01); *G08G 1/162* (2013.01); *G08G 1/163* (2013.01);
(Continued)

(58) Field of Classification Search
CPC ....... H04W 4/02; H04W 4/046; H04W 40/08; H04L 43/028; G08G 1/093; G08G 1/161; G08G 1/02
See application file for complete search history.

(56) References Cited

U.S. PATENT DOCUMENTS 8,050,188 B2 11/2011 Bai
9,014,921 B2 4/2015 Bretzigheimer
(Continued)

FOREIGN PATENT DOCUMENTS

DE 102004030994 1/2006
DE 102006029525 1/2007
(Continued)

OTHER PUBLICATIONS

Notification of Reasons for Refusal for Japanese Application No. 2016-535497, dated Apr. 14, 2017, including English translation, 13 pages.
(Continued)

*Primary Examiner* — Shukri Taha
(74) *Attorney, Agent, or Firm* — RatnerPrestia

(57) ABSTRACT

A method for relaying a data packet containing at least positional data, the data packet being carried in a transmission signal and received via a vehicular ad hoc network. The method includes the following steps: filtering the received data packet based on a predetermined filter condition; and relaying the filtered data packet to an additional receiver based on an identification of whether the filtered data packet should be relayed to the additional receiver.

6 Claims, 9 Drawing Sheets

(51) Int. Cl.
*G08G 1/09* (2006.01)
*G08G 1/16* (2006.01)
*H04L 29/08* (2006.01)
*H04L 12/26* (2006.01)
*H04W 40/08* (2009.01)
*H04W 4/02* (2018.01)
*H04W 4/04* (2009.01)

(52) U.S. Cl.
CPC ............ *H04L 43/028* (2013.01); *H04L 67/12* (2013.01); *H04W 4/02* (2013.01); *H04W 4/046* (2013.01); *H04W 40/08* (2013.01)

(56) References Cited

U.S. PATENT DOCUMENTS

| | | | |
|---|---|---|---|
| 9,198,191 B2 | 11/2015 | Wischhof | |
| 2007/0002866 A1 | 1/2007 | Belstner et al. | |
| 2008/0144493 A1* | 6/2008 | Yeh .................. | H04W 74/0816 370/230 |
| 2009/0323579 A1 | 12/2009 | Bai et al. | |
| 2012/0220231 A1 | 8/2012 | Stahlin | |
| 2012/0239294 A1* | 9/2012 | Stahlin .................. | H04L 67/12 701/484 |
| 2013/0065530 A1* | 3/2013 | Gansen .................. | H04L 12/66 455/41.2 |
| 2013/0083679 A1 | 4/2013 | Krishnaswamy | |
| 2013/0158862 A1* | 6/2013 | Stahlin .................. | H04W 4/22 701/410 |
| 2014/0274182 A1* | 9/2014 | Menzel ................ | H04B 7/0871 455/509 |

FOREIGN PATENT DOCUMENTS

| | | |
|---|---|---|
| DE | 112009001557 | 5/2011 |
| DE | 102011080789 | 2/2012 |
| EP | 2178064 | 4/2010 |
| JP | 2007013961 A | 1/2007 |
| JP | 2012015714 A | 1/2012 |
| JP | 2012169796 A | 9/2012 |
| WO | 2010139526 | 12/2010 |
| WO | 2013052127 A1 | 4/2013 |
| WO | 2013056781 | 4/2013 |

OTHER PUBLICATIONS

Bouassida, M.S., et al., "A cooperative congestion control approach within VANETs: Formal verification and performance evaluation," 2010, pp. 1-13, vol. 10, EURASIP Journal on Wireless Communications and Networking, Article ID 712525.

Eenennaam, M.V., et al., "Impact of IEEE 1609.4 channel switching on the IEEE 802.11p beaconing performance," 2012, ISBN: 978-1-4673-4404-3, 2012 IEEE.

German Search Report for German Application No. 10 2014 216 781.7 dated Dec. 4, 2014, including partial translation.

International Search Report for International Application No. PCT/EP2014/067940 dated Mar. 2, 2015.

Written Opinion of the International Searching Authority for International Application No. PCT/EP2014/067940 dated Mar. 2, 2015.

* cited by examiner

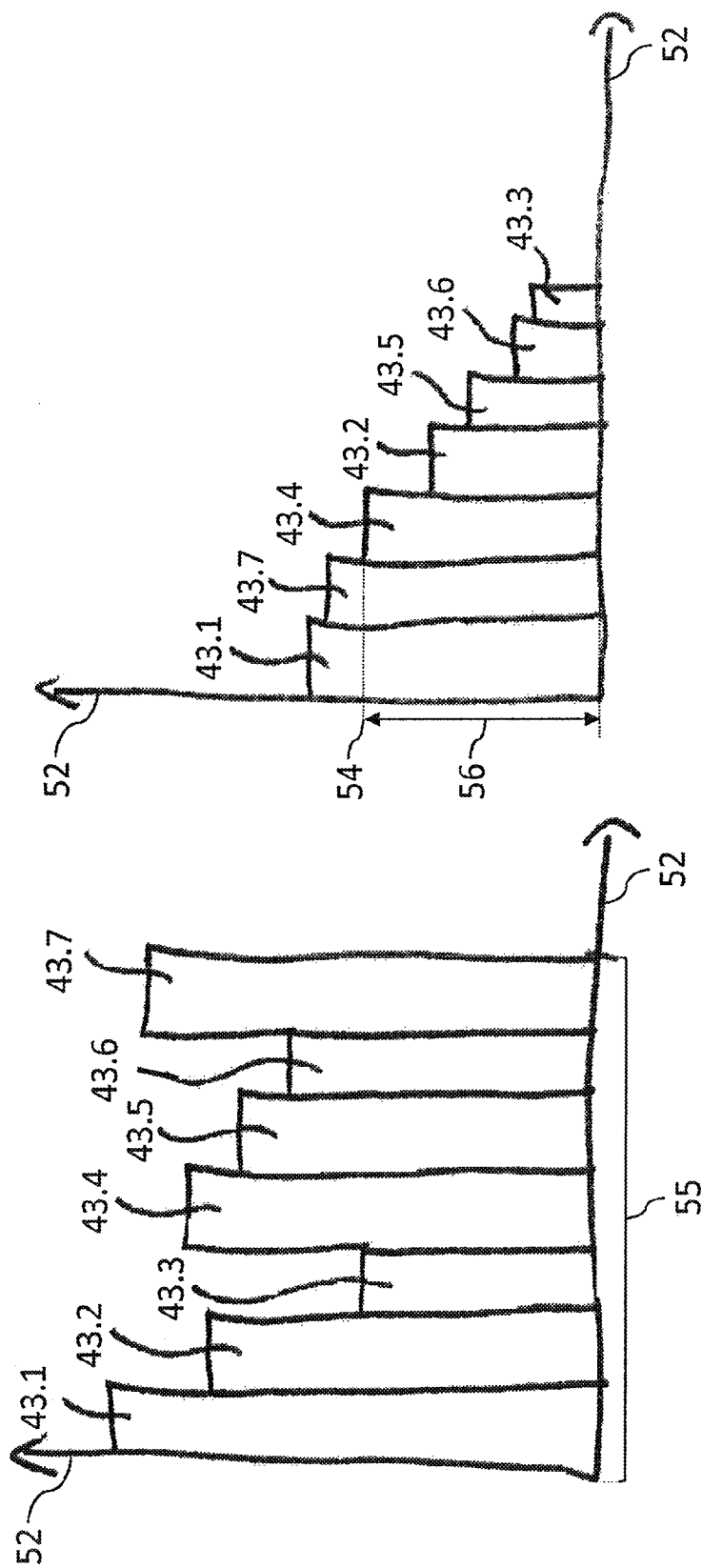

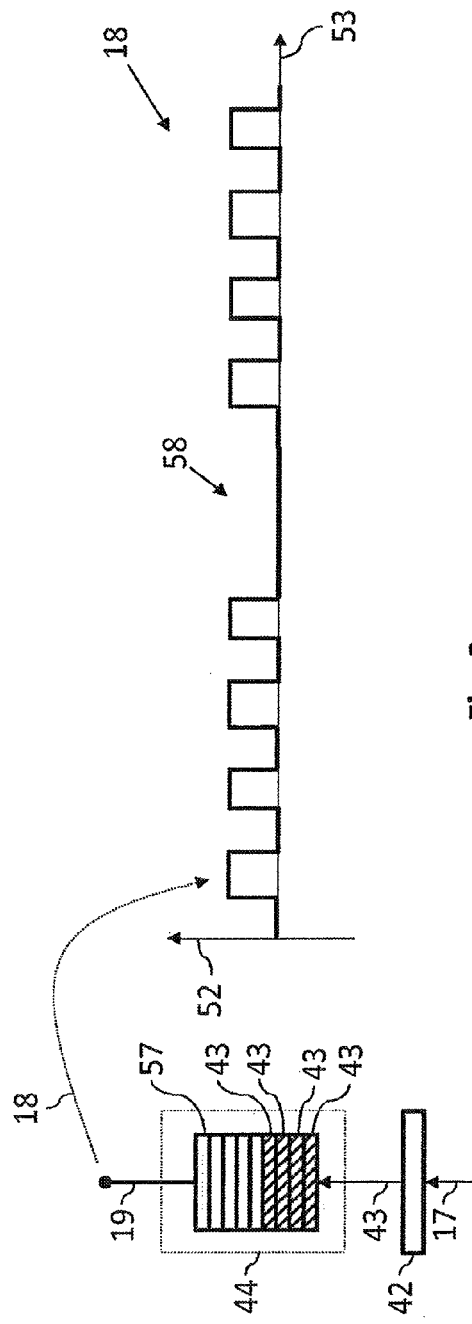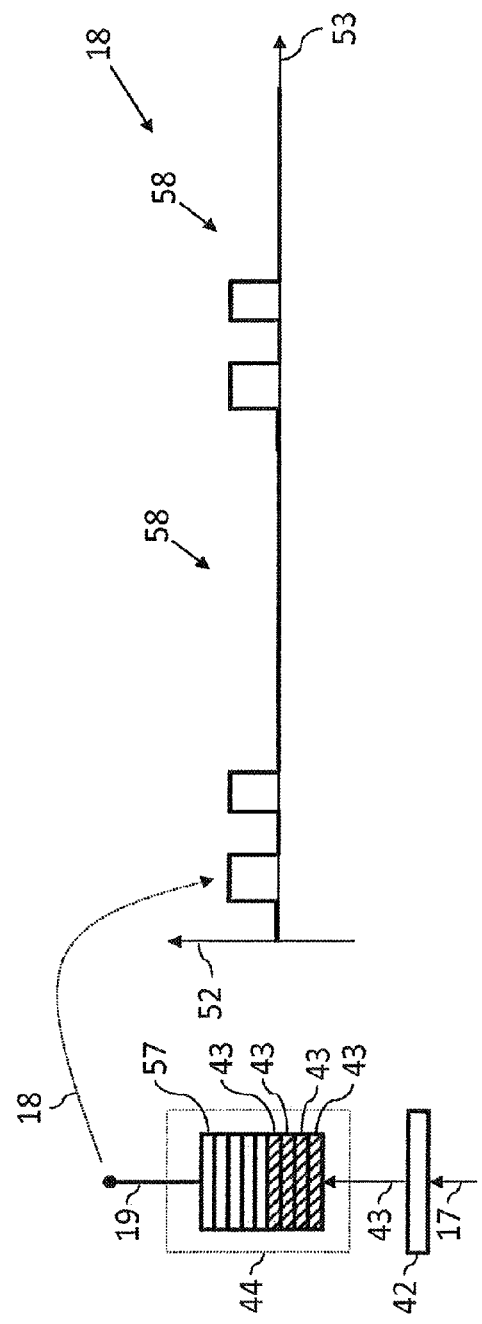
Fig. 8a
Fig. 8b

FILTERING DATA PACKETS TO BE RELAYED IN THE CAR2X NETWORK

CROSS REFRENCE TO RELATED APPLICATIONS

This application is the U.S. National Phase Application of PCT International Application No. PCT/EP2014/067940, filed Aug. 22, 2014, which claims priority to German Patent Application No. 10 2013 216634.6, filed Aug. 22, 2013, the contents of such applications being incorporated by reference herein.

FIELD OF THE INVENTION

The invention relates to a method for forwarding a data packet, containing at least position data, that is carried in a transmission signal and received via a vehicle ad hoc network, to a forwarding apparatus for performing the method and to a transceiver having the forwarding apparatus.

BACKGROUND OF THE INVENTION

WO 2010/139 526 Al, which is incorporated by reference, discloses a mobile ad hock network called car2X whose nodes are particular road users, such as vehicles, or other objects in road traffic, such as traffic lights. These networks can be used to provide the road users involved in the car2X network with advice of road traffic states, such as accidents, congestion, hazard situations, etc.

SUMMARY OF THE INVENTION

An aspect of the invention is to improve the use of such mobile ad hoc networks.

According to one aspect of the invention, a method for forwarding a data packet, containing at least position data, that is carried in a transmission signal and received via a vehicle ad hoc network comprises:
  filtering of the received data packet on the basis of a predetermined filter condition,
  forwarding of the filtered data packet to a further receiver on the basis of an identification of whether the filtered data packet is intended to be forwarded to the further receiver.

The specified method is based on the consideration that, depending on the traffic situation, a vehicle ad hoc network can encounter different levels of data load that then need to be processed by the relevant receivers in the vehicles or other nodes involved in the vehicle ad hoc network. Roughly speaking, this involves messages in the vehicle ad hoc network that are to be sent being first of all packed into data packets that are then in turn modulated onto a transmission signal. Accordingly, a receiver of the sent messages first of all needs to filter the data packets out of the transmission signal and then unpack the messages from the filtered data packets. Only then can the messages be used to inform the driver of a vehicle or even to actively control the vehicle. A correspondingly computation-intensive algorithm is also necessary for forwarding, for example in order to make a decision about the forwarding per se on the basis of a surroundings table or the like.

Filtering from the transmission signal and particularly unpacking the messages from the data packets require appropriate computation resources that need to have been dimensioned to be sufficiently powerful for the data load arising in the vehicle ad hoc network, the dimensioning needing to be oriented to the maximum possible channel load in the extreme case. However, the maximum possible channel load is utilised only in particularly extreme situations, such as very high traffic volumes (congestion, etc.), in which vehicle ad hoc networks normally also transmit a large number of messages with redundant information or information of no interest. Data packets that contain such messages with redundant information or information of no interest could be eliminated, in principle.

However, a decision about this is likewise associated with a correspondingly high level of computation complexity, because the decision about the information first of all requires the message reporting this information to be unpacked. If the data packets are therefore filtered on the basis of the information delivered with the messages, there can be no particular reduction expected in the computation complexity and hence in the computation resources that need to be kept on hand.

This is the starting point for the specified forwarding method with the consideration of rating the data packets not on the basis of the messages packed therein but rather beforehand either on the basis of the data packets themselves or even at the level of the transmission signal. To this end, a predetermined condition is introduced, on the basis of which a decision can be made about whether the transmission signal and/or the data packet itself can actually be taken as a basis for identifying the extent to which the message packed in the data packet is relevant and whether there is sufficient need (relevance) or even sufficient opportunity (sufficient free channel capacity) to forward the data packet.

Such an approach is already known from object identification using a camera system, which likewise needs to be taken as a basis for making sometimes road-safety-critical decisions. The volume of data from a camera on which object identification is based is so high that the immediate volume of pixel data from the camera cannot be used directly for all necessary object identification operations. Thus, the necessary information from the volume of pixel data is collected in intermediate stages and compressed progressively more. Thus, in a first intermediate stage, object and scene information determined from the volume of pixel data, for example, can be collected, such as whether the lane is to the left and/or right of the vehicle. If an incorrect decision is made in an intermediate stage, however, then this incorrect decision is reflected in all subsequent intermediate stages and results in relevant objects or scenes possibly not being identified as such. Over time, however, the best possible recognition of all relevant objects is ensured because a trade-off is always made between computation effort and identification performance.

Based on the insight that the pixels from the camera, like the data packets in the vehicle ad hoc network, are a type of raw data for the processing system in the vehicle, the principle of object identification using a camera system can also be transferred to the transmission of information using the vehicle ad hoc network, with the selection of the relevant messages being performed at the level of the transmission signal and/or the data packets, as already explained. This admittedly no longer ensures that all important data packets are actually forwarded. However, it can be assumed that data packets with relevant messages, such as from a breakdown on the road, are sent more frequently. The constantly changing constraints between two sent data packets with the same message and from the same sender mean that, on statistical average, it can be assumed that the data packets pass through the filter defined by the predetermined condition in timely fashion and thus reach the desired destination in timely fashion. As in the case of the aforementioned object identification using the camera system, the present invention therefore involves the proposal of trading off computation complexity and identification performance. This is implemented with the predetermined condition, which is expediently altered over time, in order to trade off computation complexity and identification performance.

In one development of the specified method, the data packets can be filtered on the basis of the transmission signal carrying the data packets. To this end, the predetermined filter condition can comprise a predetermined reception field strength at which the transmission signal carrying the data packet to be forwarded needs to be received. The reception field strength of the received signal can be taken as a basis for assessing the distance of the sender of the data packet to be forwarded, for example, since the greater the distance of the sender of the data packet, the lower the reception field strength. Solely on the basis of this criterion, it is possible to make really meaningful assessments of whether or not the data packet should be forwarded regardless of the message itself.

A way of using the reception field strength to filter data packets that are to be forwarded is to filter the received data packet if the transmission signal carrying the received data packet has a reception field strength that exceeds the predetermined reception field strength. This development is based on the consideration that a forwarding sender that is situated very close to the sender of the data packet that is to be forwarded cannot perceptibly increase the range of the data packet that is to be forwarded. Consequently, there is also a decrease in the probability of the data packet that is to be forwarded being received by a node of the vehicle ad hoc network that is not also already reached by the original sender of the data packet that is to be forwarded. Therefore, forwarding is superfluous at this juncture and unnecessarily wastes computation resources.

In an additional development of the specified method, the reception field strength is dependent on a statistical condition that is determined on the basis of a number of data packets received over a predetermined period. This determination can be taken as a basis for considering, by way of example, the traffic situation that there are only very few nodes in the immediate communication region of the node carrying out the specified method in the vehicle ad hoc network and, in this case, every chance for every node in this immediate communication region to receive all relevant data packets should be used.

In a particular development, the statistical condition could be a quantile, for the data packets received over a predetermined period in the transmission signal. The quantile can be defined arbitrarily, in principle. Particularly advantageously, it is defined as a percentile that involves, by way of example, the predetermined reception field strength being able to be stipulated as a particular percentage of the most highly received reception field strengths in the period. By way of example, the percentile may be stipulated between 50% and 99%, preferably between 70% and 80%, particularly preferably as 75%.

In another development of the specified method, the data packet contains a message having a priority, wherein the predetermined condition is a predetermined priority for the priority of the message. Such priorities are defined as data traffic classes in the "Draft C2C-CC Basic System Standards Profile", for example. With a low-priority data traffic class, it is also possible to assume a decreasing quality of service, although a particular quality of service cannot be guaranteed because the communication in the vehicle ad hoc network takes place wirelessly based on the principle and is subject to the physical circumstances of the wave propagation. On the basis of the data traffic class, it is first of all possible to check whether forwarding of a data packet that is to be forwarded would be successful. Only if this is true with a particular probability is the data packet that is to be forwarded also actually forwarded.

Expediently, a fixed or statistically ascertained threshold value is chosen for the particular probability, as has already been determined for the purposes of the predetermined reception field strength in the manner previously explained. Although even model-based methods would be conceivable, the evaluation of the model ought to take up fewer computation resources than would be taken up if all data packets to be forwarded were unpacked and rated on the basis of the message contained, since the specified method is then particularly meaningful from a technical point of view.

According to a further aspect of the invention, a forwarding apparatus is set up to perform a forwarding method as claimed in one of the preceding developments.

In one development of the specified forwarding apparatus, the specified apparatus has a memory and a processor. In this case, the specified method is stored in the memory in the form of a computer program, and the processor is provided for carrying out the method when the computer program is loaded into the processor from the memory.

According to a further aspect of the invention, a computer program comprises program code means in order to perform all the steps of one of the specified methods when the computer program is executed on a computer or one of the specified apparatuses.

According to a further aspect of the invention, a computer program product contains a program code that is stored on a computer-readable data storage medium and that, when executed on a data processing device, performs one of the specified methods.

According to a further aspect of the invention, a transceiver for a vehicle for forwarding data packets sent in a transmission signal in a vehicle ad hoc network comprises:
 an antenna for receiving the transmission signal,
 a forwarding apparatus as described above for forwarding at least some of the data packets from the transmission signal.

According to another aspect of the invention, a vehicle comprises one of the specified transceivers.

A further aspect of the invention, which relates to a selection method for reducing the computation complexity of a vehicle-to-X communication system is explained below.

The prior art discloses what are known as vehicle-to-X communication systems that are designed for transmitting both traffic-related data and various service data, such as entertainment applications. In this case, the vehicle-to-X communication is based both on the data interchange between vehicles themselves (vehicle-to-vehicle communication) and on the data interchange between vehicles and infrastructure devices (vehicle-to-infrastructure communication). On account of the high demands on the reliability and data integrity of information transmitted by means of vehicle-to-X communication, such information is additionally often provided with a complex security signature or data encryption.

The evaluation of such a security signature and the decoding of such data encryption are associated with a relatively high level of computation complexity, however. Added to this is the occurrence of special situations, such as passage through a busy urban junction at rush hour, in which a number of vehicle-to-X messages is received that is such that processing of all vehicle-to-X messages received is likewise possible only through the provision of a comparatively high level of computation power. In order to keep the computation complexity and hence the purchase costs for a computation module for such a vehicle-to-X communication system as low as possible, the prior art additionally discloses various preprocessing methods that make a selection for the vehicle-to-X messages that are to be decoded from among all received vehicle-to-X messages. However, such preprocessing methods relate only to those vehicle-to-X messages that are intended for the receiver carrying out the preprocessing. Hence, the preprocessing methods known in the prior art disregard the fact that the receiver of vehicle-to-X messages forwards a multiplicity of the received vehicle-to-X messages using what is known as the georouting method in order to supply them to other receivers in a predetermined area. However, the georouting method makes comparatively high demands on the available computation power, since the corresponding forwarding algorithms are complex.

A further aspect of the invention aims to reduce the number of data packets that the georouting method needs to handle through the earliest possible filtering.

This preferably involves the joint or alternative use of two methods that utilise knowledge about the physical transmission:

Firstly, it is preferred for received data packets having a high reception field strength not to be supplied to the georouting method in high-load situations, that is to say in situations with a high computation workload for the vehicle-to-X communication system. The motivation for this is that a high reception field strength results from a short distance between sender and receiver. This short distance in turn means that forwarding of the data packet by the vehicle-to-X communication system of the receiver barely increases the area of circulation of the relevant vehicle-to-X message. It can therefore be assumed that the comparatively complex and computation-intensive georouting method would not forward the packet anyway. Since the data packet is advantageously but not at all first supplied to the georouting method, the necessary computation power for deciding about the forwarding on the basis of the complex forwarding algorithms of the georouting method is dispensed with. In this case, the threshold value for a "high field strength" can be either firmly prescribed or chosen flexibly and on a situation-dependent basis on the basis of a statistical consideration over a sliding time window of length T. In this time window T, it is then possible, by way of example, for an upper percentile of the reception field strength to be regarded as a "high field strength", e.g. P75 (that is to say the upper 75% of the field strengths in this time window). Conversely, packets having low reception field strength are supplied to the georouting method with priority.

Secondly, it is preferred for the priority of a data packet, as defined by what are known as the traffic classes, to be taken as a basis for first of all checking whether forwarding or sending of a data packet having this traffic class would actually be successful given the current channel load. The reason is that from a certain channel load, i.e. a certain utilisation level of the transmission channels used for transmitting the vehicle-to-X messages, upward, some data packets or vehicle-to-X messages are no longer sent, depending on their traffic class, in order not to "congest" the transmission channels and hence to ensure that safety-critical data packets are still sent even when the channel load is high. Only if this is probable is the received data packet supplied to the georouting method. For ascertaining the probability, it is possible to use fixed threshold values for the channel load, for example, or these can be determined on a situation-dependent basis by means of statistical methods, in a similar manner to the procedure described above. Model-based methods using corresponding models of the transmission channel are likewise preferred, even though a comparatively high level of computation complexity for the model itself may arise in this case.

An aspect of the invention therefore describes a method that improves the efficiency of the georouting method, since the proportion of messages examined by the georouting method that are unable to be successfully re-sent or need to be re-sent in the first place is reduced. This significantly lowers the required computation power for the whole vehicle-to-X communication system. This in turn allows the use of computation units that have less computation power and hence are cheaper.

In addition, the method according to an aspect of the invention means that a vehicle-to-X communication system that would normally be unable to perform a georouting method at all on account of its weak computation power can forward at least some important data packets.

In this case, the received vehicle-to-X messages are forwarded to further receivers preferably using what is known as the multi-hop method.

A vehicle-to-X message preferably consists of or comprises a series of data packets that each describe a piece of information or multiple contiguous pieces of information pertaining to a particular aspect of the vehicle environment or of the traffic scenario.

BRIEF DESCRIPTION OF THE DRAWINGS

The properties, features and advantages of this invention that are described above and also the manner in which they are achieved will become clearer and more distinctly comprehensible in connection with the description of the exemplary embodiments that follows, said exemplary embodiments being explained in more detail in connection with the drawings, in which.

DETAILED DESCRIPTION OF THE PREFERRED EMBODIMENTS

In the figures, like technical elements are provided with like reference symbols and described only once.

Figure 3:
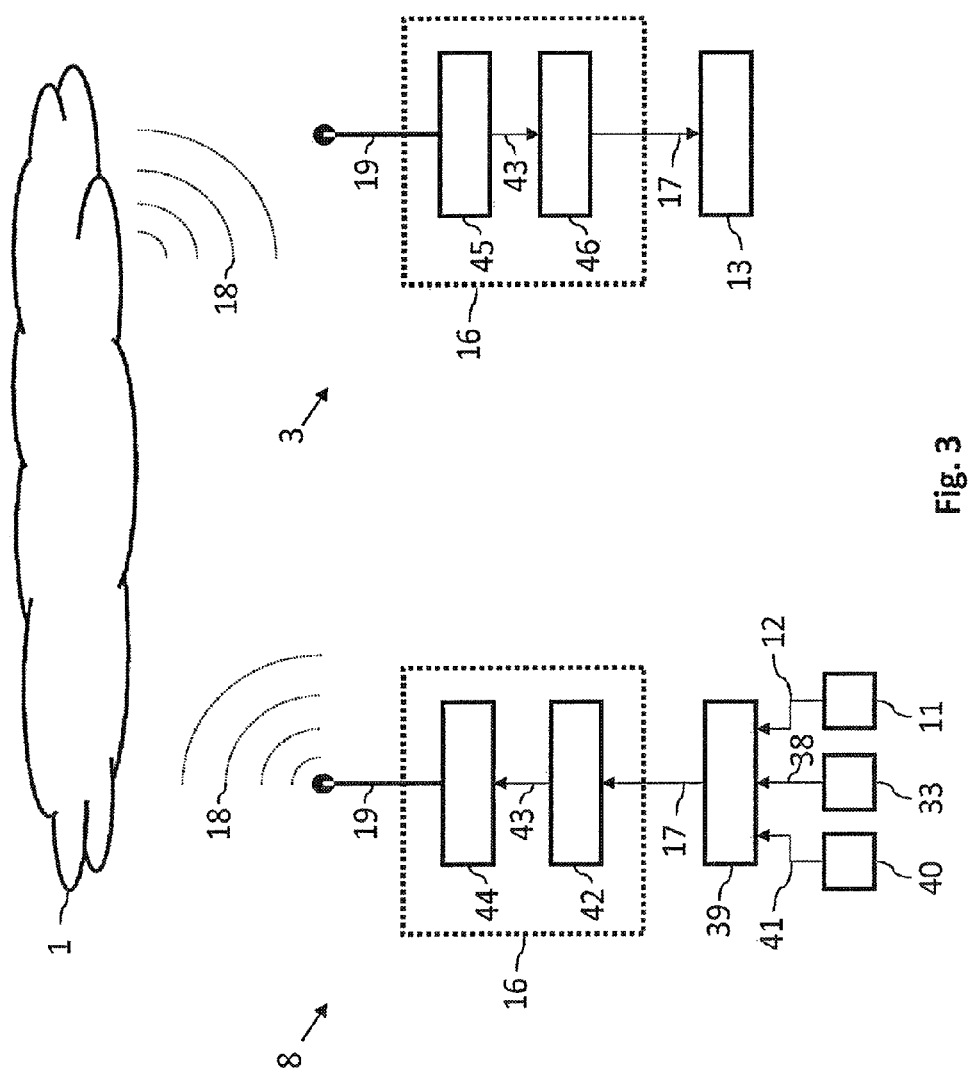
FIG. 3 shows a basic illustration of a vehicle ad hoc network in which the vehicle from FIGS. 1 and 2 can be involved.

The invention relates to a network protocol for a vehicle ad hoc network shown in FIG. 3, which is called car2X network 1 below for the sake of simplicity. To provide a better understanding of the technical background to this car2X network 1, a nonrestrictive exemplary embodiment will first of all be provided for this car2X network 1 before discussing technical details pertaining thereto in more detail.

Figure 1:
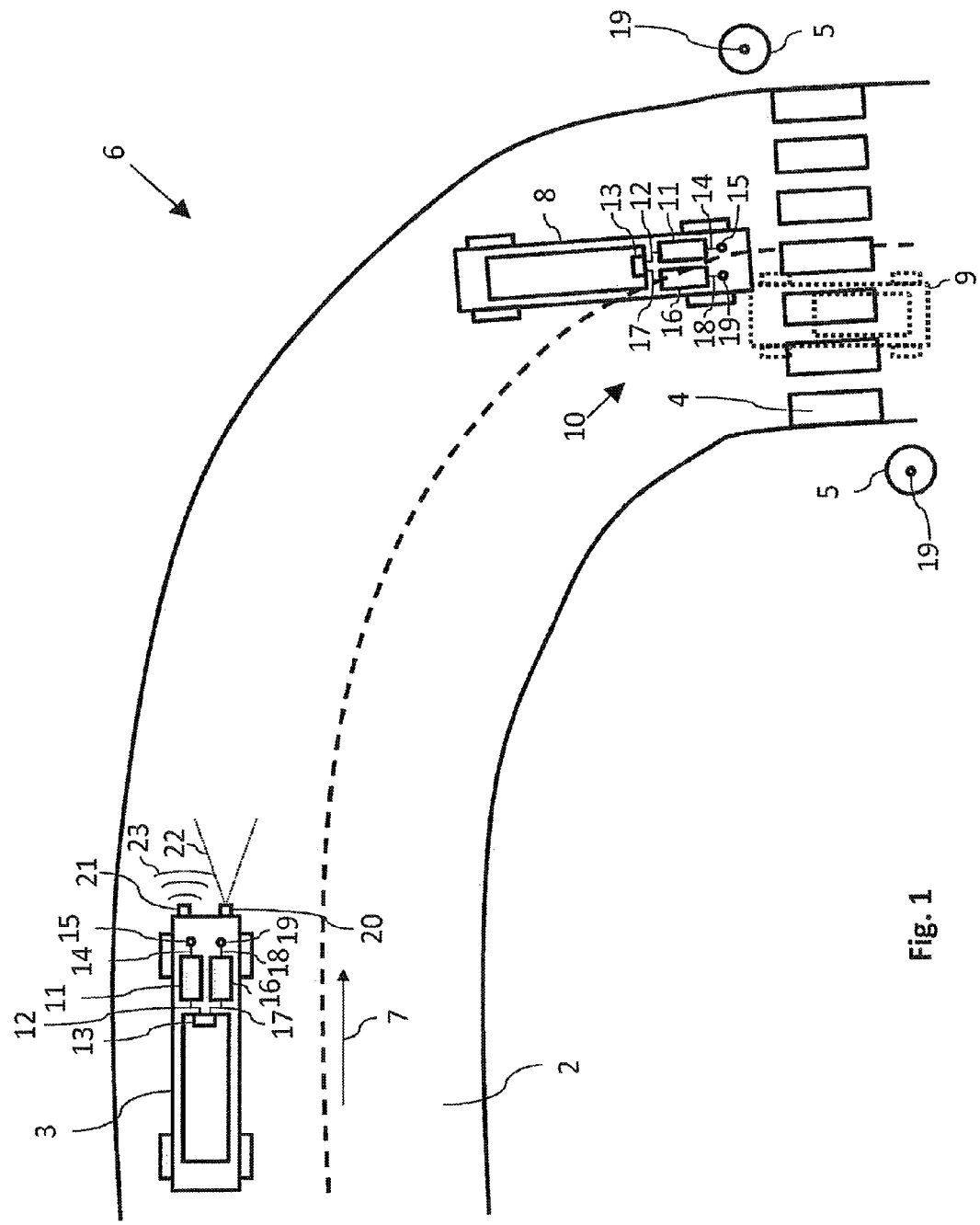
FIG. 1 shows a basic illustration of a vehicle travelling on a road.

Therefore, reference is made to FIG.1, which shows a basic illustration of a vehicle 3 travelling on road 2.

In the present embodiment, the road 2 is meant to have a pedestrian crossing 4 at which a set of traffic lights 5 is used to regulate whether the vehicle 3 on the road 2 is permitted to cross the pedestrian crossing 4 or a pedestrian—not shown in more detail—on the pedestrian crossing 4 is permitted to cross the road 2. Between the pedestrian crossing 4 and the set of traffic lights 5, there is, for the purposes of the present embodiment, an obstacle in the form of a curve 6 that conceals the pedestrian crossing 4 from the driver of the vehicle 3 and from an ambient sensor system—which is yet to be described—of the vehicle 3.

In a direction of travel 7 ahead of the vehicle 3, FIG. 1 shows a further vehicle 8 that has been involved in a road accident 10 with a vehicle 9—shown in dots—on the pedestrian crossing 4 and is blocking the lane in the direction of travel 7 of the vehicle 3.

The pedestrian crossing 4 and the road accident 10 are hazard situations on the road 2. If the driver of the vehicle 3 overlooks the pedestrian crossing 4 and therefore illegally fails to stop before it, he could hit a pedestrian who is crossing the pedestrian crossing 4 and who, in crossing the pedestrian crossing 4, relies on the driver of the vehicle 3 behaving in accordance with the rules. In both hazard situations, the driver of the vehicle 3 must stop the vehicle 3 in order to avoid a collision with the hazard object in the hazard situation, that is to say the pedestrian and/or the further vehicle 8. To this end, the car2X network 1 can be used, which will be discussed in more detail at a later juncture.

In the present embodiment, the vehicle 3 has a receiver 11 for a global satellite navigation system, called a GNSS receiver 11 below, which the vehicle 3 can use in a manner known per se to determine position data in the form of its absolute geographical position 12 and to use said position data for the purposes of a navigation system 13, for example, in order to display them on a geographical map, which is not shown further. Corresponding signals 14 from the global satellite navigation system, called GNSS signals 14 below, can be received via an appropriate GNSS antenna 15, for example, and forwarded to the GNSS receiver 11 in a manner known per se.

In the present embodiment, the vehicle additionally has a transceiver 16 that the vehicle 3 can use to be involved as a node in the car2X network 1 and to interchange messages, called car2X messages 17 below, with other nodes, such as the further vehicle 8 and/or the set of traffic lights 5. In order to distinguish it from the GNSS receiver 11, this transceiver 16 will be called car2X transceiver 16 below.

In the car2X messages 17 interchanged by the car2X network 1, the individual nodes 3, 5, 8 can interchange data describing various information with one another, which data can be used to increase road safety on the road 2, for example. An example of the information that can be interchanged with the data in the car2X messages 17 would be the absolute geographical position 12, determined using the GNSS receiver 11, of the respective node 3, 5, 8 of the car2X network 1. Such data can also be called position data. If the node 3, 5, 8 of the car2X network 1 that receives the geographical position 12 is a vehicle, such as the vehicle 3 that is not involved in the road accident 10 and the vehicle 8 that is involved in the road accident 10, then the geographical position 12 received via the car2X network 1 can be used to represent the traffic movement, for example, on the navigation system 13 of the receiving vehicle 3, 8, for example. If, besides the absolute geographical position 12, the road accident 10 is also described as information with the data in the car2X message 17, then determined traffic situations, such as the road accident 10, can be represented on the navigation system 13 more specifically. Further possible information that can be interchanged with the car2X messages 17 will be discussed in more detail later for the purposes of FIG. 2.

Figure 2:
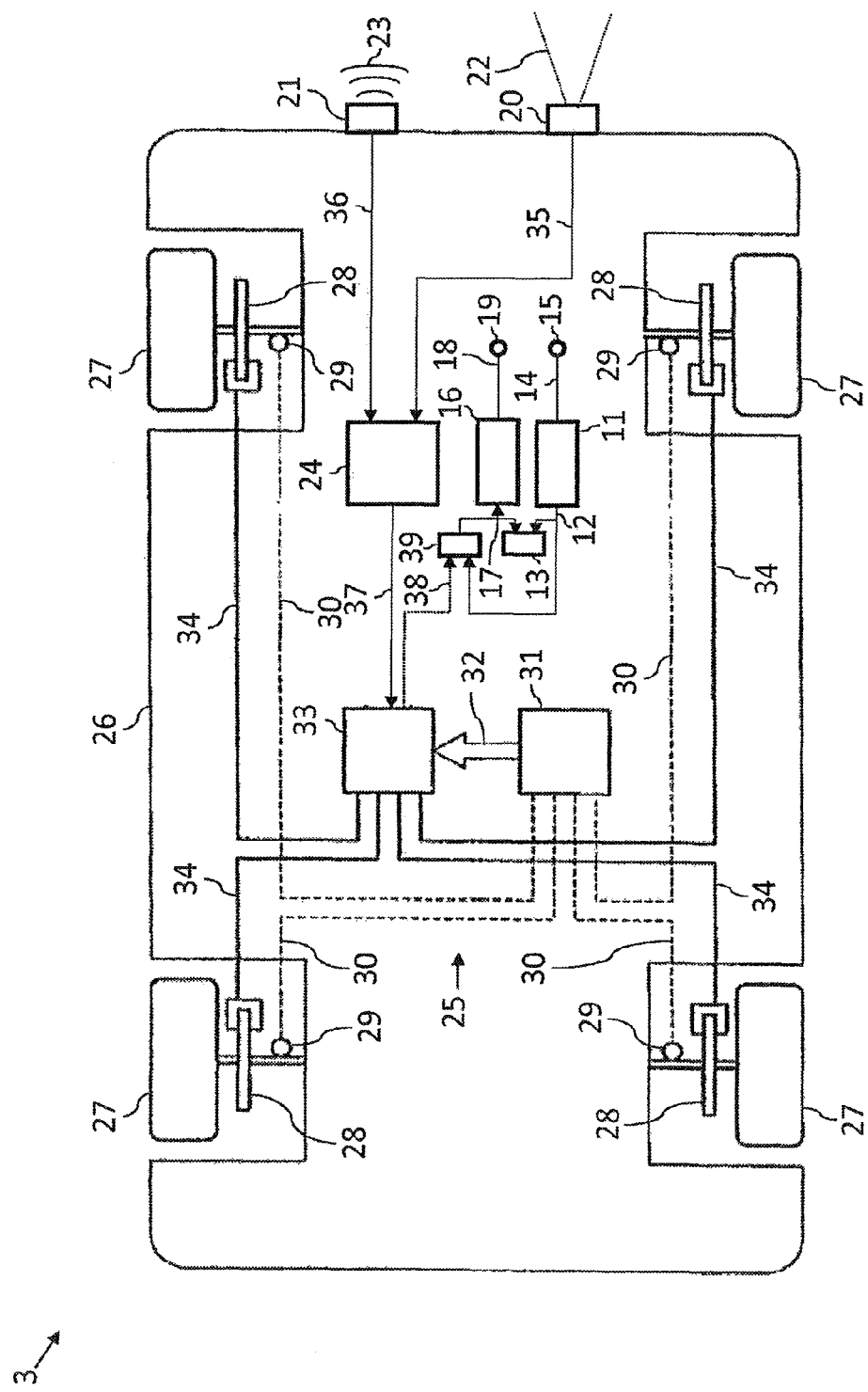
FIG. 2 shows a basic illustration of the vehicle from FIG. 1.

In order to interchange the car2X messages 17, the car2X transceiver 16 either modulates a car2X message 17 onto a transmission signal, called car2X signal 18 below, and sends it via an antenna, called car2X antenna 19 below, to the other nodes 3, 5, 8 in the car2X network 1, or it uses the car2X antenna 19 to receive a car2X signal 18 and filters the relevant car2X message 17 therefrom. This will be discussed in more detail at a later juncture for the purposes of FIG. 3. In this case, FIG. 1 shows that the car2X transceiver 16 outputs a car2X message 17 to the navigation system 13 on the assumption that said message contains, in the manner described above, information that can be represented on said navigation system. This is not intended to be understood as a restriction, however. In particular, it is expediently also possible for the GNSS receiver 11 to be connected to the car2X transceiver 16 directly or, as shown in FIG. 2, indirectly in order to send its own absolute geographical position 12 in the car2X network 1.

The structure of the car2X message 17 and of the car2X signal 18 and hence the design of the car2X network can be defined in a communication protocol. There are already such communication protocols on a country-specific basis, inter alia for the purposes of ETSI TC ITS at ETSI in Europe and for the purposes of IEEE 1609 at IEEE and also at SAE in the United States of America. Further information in this regard can be found in the cited specifications.

The vehicle 3 can optionally also have the aforementioned ambient sensor system in the form of a camera 20 and a radar sensor 21. The camera 20 can be used by the vehicle 3 to record an image of a view that is ahead of the vehicle 3, when considered in the direction of travel 7 of the vehicle 3, within an image angle 22. In addition, the vehicle 3 can use the radar sensor 21 and appropriate radar beams 23 to identify objects, when considered in the direction of travel 7 of the vehicle 3, and to determine the distance from the vehicle 3 in a manner known per se.

In order to substantiate the information that can be transmitted with a car2X message 17, the design of the vehicle 3 and of the further vehicle 5 will first of all be discussed below on the basis of the vehicle 3 by way of example. The vehicle 3 has various safety components, of which FIG. 2 shows an electronic braking assistant 24, called EBA 24, and a driving dynamics control system 25, which is known per se. While DE 10 2004 030 994 Al provides details pertaining to the EBA 24, DE 10 2011 080 789 Al provides details pertaining to the driving dynamics control system 25.

The vehicle 3 comprises a chassis 26 and four wheels 27. Each wheel 27 can be slowed down in comparison with the chassis 26 by means of a brake 28, mounted at a fixed location on the chassis 26, in order to slow down a movement by the vehicle 3 on the road 2.

In this case, in a manner that is known to a person skilled in the art, it may occur that the wheels 27 of the vehicle 3 lose their traction and the vehicle 3 even moves away from a trajectory, for example prescribed by means of a steering wheel, which is not shown further, as a result of understeer or oversteer. This is avoided by the driving dynamics control system 25.

In the present embodiment, the vehicle 4 has speed sensors 29 on the wheels 27 for this purpose, which sense a speed 30 of the wheels 27.

On the basis of the sensed speeds 30, a controller 31 can determine, in a manner that is known to a person skilled in the art, whether the vehicle 3 slips on the carriageway or even deviates from the aforementioned prescribed trajectory, and can react thereto accordingly with a control output signal 32 that is known per se. The controller output signal 32 can then be used by an actuating device 33 in order to use actuating signals 34 to actuate actuating elements, such as the brakes 28, which react to the slipping and the deviation from the prescribed trajectory in a manner that is known per se.

The EBA 24 can evaluate image data 35, captured using the camera 20, and distance data 36, captured using the radar sensor 21, pertaining to objects such as vehicles in the direction of travel 7 ahead of the vehicle 3 and, on the basis thereof, can sense a hazard situation. This hazard situation could arise, by way of example, when an object ahead of the vehicle 3 approaches the latter at an excessive speed. In such a case, the EBA 24 could use an emergency braking signal 37 to instruct the actuating device 33 to use the actuating signal 34 to carry out emergency braking with the brakes 28.

Each time the EBA 24 or the driving dynamics control system 25 uses the actuating device 33 to take action in the vehicle 4, the actuating device 33 can output a report signal 38, for example, which is shown in dots in FIG. 2. Expediently, the report signal 38 should substantiate whether the action was required by the EBA 24 or the driving dynamics control system 25. Such a report signal 38 can be produced by any entity in the vehicle 3, that is to say even by the controller 31 of the driving dynamics control system 25, for example. A message generation device 39 could then take the report signal 38, the absolute geographical position 12 and a timestamp 41, which is shown in FIG. 3 and output from a timer 40, as a basis for generating a car2X message 17 that can be used to report the action of the EBA 24 and/or of the driving dynamics control system 25 to the other nodes 5, 8 as information via the car2X network 1. The car2X message 17 generated in this manner could then be sent in the car2X network 1 via the car2X antenna 19.

In the example of FIG. 1, it was explained that the information about the absolute geographical position 12 of the individual nodes 3, 5, 8 and/or about events such as the road accident 10 and/or such as an action by the EBA 24 and/or the driving dynamics control system 25 that is interchanged in the car2X messages 17 could be represented on the navigation system 13 for the purpose of orienting the driver. Alternatively or additionally, the information interchanged in the car2X messages 17 can also be taken as a basis for actively generating actuating signals 34, for example using the actuating device 33, however. If, by way of example, the action by the EBA 24 is transmitted as information in a car2X message 17, then it would be possible, by way of example, to take the reception of this car2X message 17 as a basis for automatically triggering the EBA 24 in the receiving vehicle 3, 8.

The transmission of a car2X message 17 via the car2X network 1 will be explained below with reference to FIG. 3, said car2X network being indicated by a cloud in FIG. 3 for the sake of clarity. The content of the car2X message 17 is intended to be assumed to be, by way of example, an action—reported by the actuating device 33 with the report signal 38—by the EBA 24 in the accident vehicle 8 involved in the road accident 10.

As already explained, the message generation device 39 takes the report signal 38, the absolute geographical position 12 and the timestamp 41 as a basis for generating the car2X message 17 according to the aforementioned communication protocol. In this case, the message generation device 39 may also be part of the car2X transceiver 16, in principle.

From the car2X message 17, data packets 43 are generated in a data packet generation device 42 in the car2X transceiver 16 of the accident vehicle 8. The generation of data packets 43 means that car2X messages 17 from various applications in the accident vehicle 8 can be combined to form a single data stream in order to produce the car2X signal 18. The data packet generation device 42 is based on a network and transport layer, the task of which is known to be to route the network data from various applications. When a received data packet 43 is forwarded to further subscribers 3, 5, 8 in the car2X network 1, the message generation device 39 and the data packet generation device 42 jointly represent the network and transport layer, which, however, is essentially dependent on the aforementioned specification of the communication protocol for the car2X network 1.

The generated data packets 43 are modulated onto the car2X signal 18 in a modulation device 44 and wirelessly sent in the car2X network 1. The modulation device 44 therefore corresponds to an interface layer, the task of which is to physically connect the accident vehicle 8 to the car2X network 1. The design of the modulation device 44 is also dependent on the aforementioned specification of the communication protocol for the car2X network 1.

In the vehicle 3 that is not involved in the road accident 10, the car2X signal 18 sent by the accident vehicle 8 can then be received via the car2X antenna 19.

In order to extract the car2X message 17 from the car2X signal 18, the car2X transceiver 16 of the vehicle 3 has a demodulation device 45 that reverses the sender-end modulation of the data packets 43 in a manner that is known per se. Accordingly, a message extraction device 46 can extract the car2X messages 17 from the data packets 43 and make them available to the applications in the vehicle 3, such as the navigation system 13 or even the actuating device 33. Ultimately, the demodulation device 45 and the message extraction device 46 are the reception-end counterparts in accordance with the aforementioned network and transport layer and the interface layer and are likewise dependent on the aforementioned specification of the communication protocol for the car2X network 1.

For details of the individual network layers, reference is therefore made to the relevant specifications.

Particularly in high-load situations when there are a multiplicity of nodes 3, 5, 8 in the car2X network 1 on the road 2, it is necessary for correspondingly high levels of computation resources to be kept free in the respective nodes 3, 5, 8 for the purpose of processing all car2X messages 17 sent in the car2X network 1, in order to guarantee the processing of all car2X messages 17 at the receiver end within particular time limits. The provision of these high levels of computation resources is associated with a correspondingly high outlay in terms of cost, which is intended to be reduced for the purposes of the present embodiment by the introduction of initial filters 47, 48.

Figure 4:
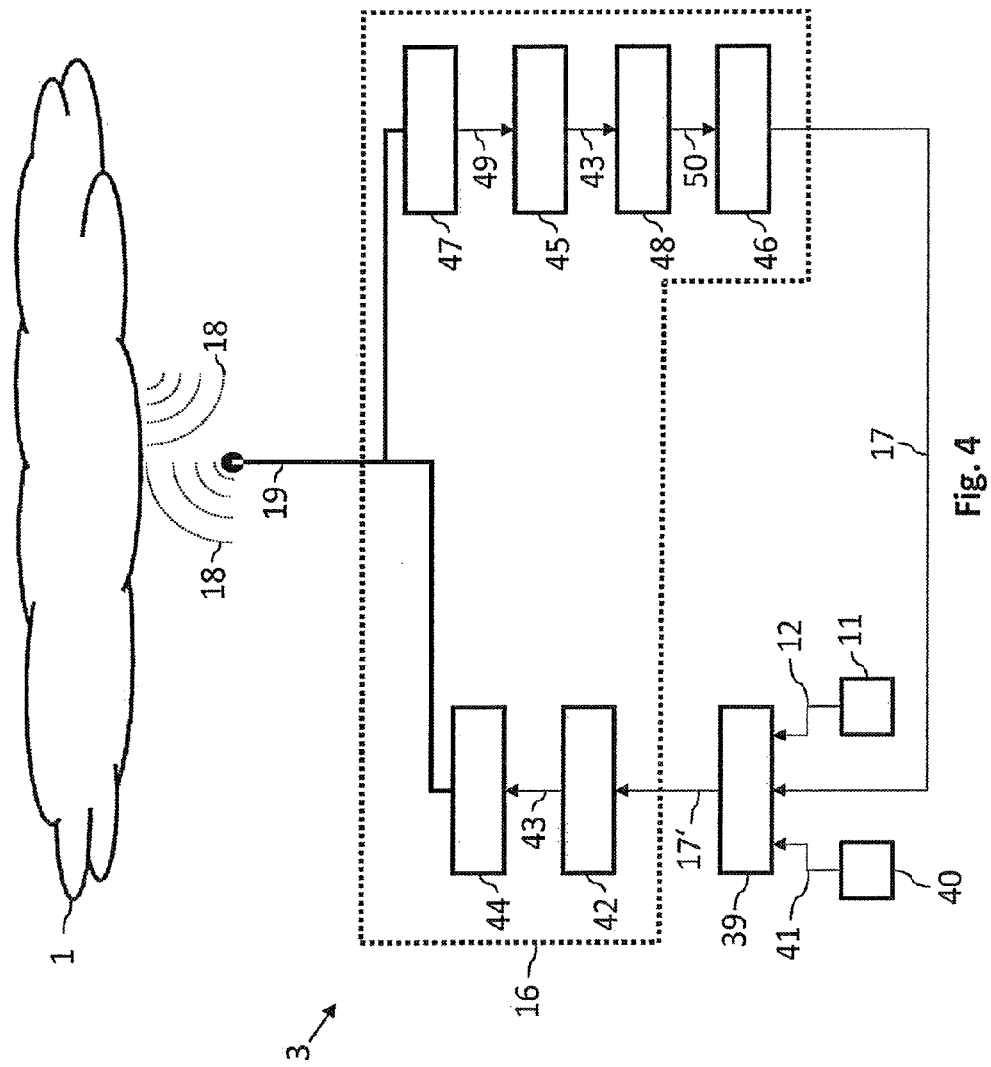
FIG. 4 shows a basic illustration of a transceiver in the vehicle ad hoc network 1 from FIG. 3.

A particular case in which a particularly large amount of computation resources are necessary in high-load situations will be explained briefly below with reference to FIG. 4, which shows the data packet generation device 42, the modulation device 44, the demodulation device 45 and the message extraction device 46 in the vehicle 3 that is not involved in the accident 10 in a common car2X transceiver 16, as will be the normal case.

If the vehicle 3 that is not involved in the road accident 10 receives a car2X message 17 providing information about this road accident 10, then the vehicle 3 that is not involved in the road accident 10 can provide this car2X message 17' with a timestamp 41 of its own and with its geographical position 12 and forward it, as a car2X message 17' that is to be forwarded, to other nodes 5, 8 in the car2X network 1. The decision about the forwarding can be taken in the message generation device 39, for example, on the basis of particular criteria, which are not intended to be of further interest below.

What is intended to become clear, however, is that the decision regarding whether a car2X message 17 received in a car2X signal 18 and packed in a data packet 43 is intended to be forwarded is taken fundamentally on the basis of the information in the car2X message 17, which is why each car2X message 17 ought to be extracted from the car2X signal 18 for the purposes of this scheme. This is the point at which the present embodiment having a first initial filter 47 and a second initial filter 48 takes effect.

Whereas the first initial filter 47 outputs a filtered car2X signal 49, in which some of the data packets 43 and hence some of the car2X messages 17 can be filtered out without their each being unpacked, the second initial filter 48 outputs filtered data packets 50, from which some of the data packets 43 originally sent in the car2X signal 18 can likewise be filtered out without the car2X messages 17 packed therein each being unpacked.

The concept behind the initial filters 47, 48 is for car2X messages 17 that are potentially irrelevant to forwarding to be eliminated as early as possible in order to avoid their needing to be processed unnecessarily by an element in the forwarding chain because they contain either information that is irrelevant to the receiving node for the forwarded message 17' and/or redundant information. This can significantly reduce the computation complexity for the decision, which is fundamentally necessary in the message generation device 39, about forwarding of a car2X message 17.

Whereas the first initial filter 47 could in this case filter the car2X signal 18 without knowledge of the actual car2X message 17, the second initial filter 48 could filter the data packets 43 without knowledge of the actual car2X message 17. Admittedly, this no longer ensures that, of the car2X messages 17 sent in the vehicle ad hoc network 1, all safety-critical car2X messages 17, such as a report about action by the EBA 24, also actually arrive at all destination nodes 5, 8 in the car2X network 1. Normally, however, such safety-critical car2X messages 17 are not sent only once, which means that, on statistical average, it can be assumed that such safety-critical car2X messages 17 pass through the initial filters 47, 48 in at least one forwarding node in the car2X network 1 within a feasible timeframe. In order to keep this feasible timeframe as short as possible, initial filters 47, 48 can be designed such that safety-critical data pass through the initial filters 47, 48 with above-average probability.

Figure 5:
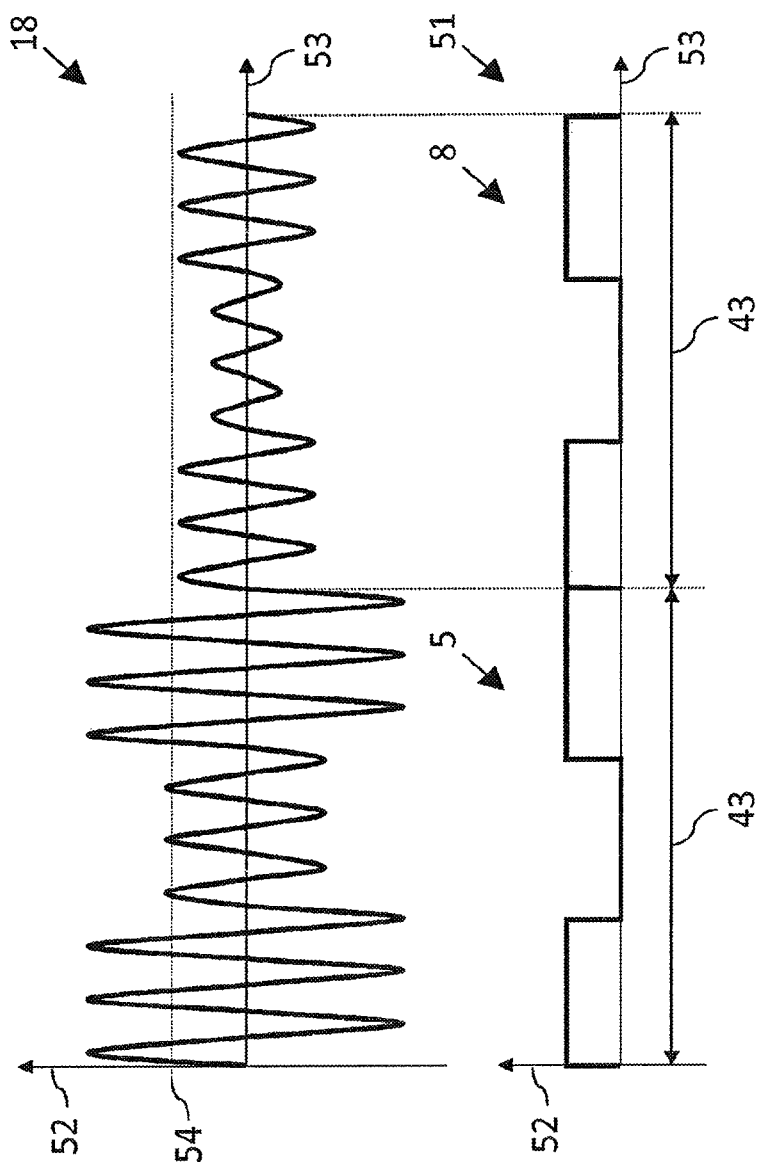
FIG. 5 shows a basic illustration of signals to be filtered that have been received from the vehicle ad hoc network from FIG. 3.

For the most efficient initial filtering possible in the initial filters 47, 48, a predetermined filter condition is introduced, according to which the car2X signal 18 is initially filtered in the first initial filter 47 and/or the data packets 43 are initially filtered in the second initial filter 48. This predetermined filter condition is explained for the first initial filter 47 below with reference to FIGS. 4 and 5, which show an example of the car2X signal 18 and a signal 51 carrying the data packets 43 that belong to the car2X signal 18, each in a signal strength 52/time 53 diagram.

The car2X signal 18 may be any carrier signal onto which the data packets 43 have been modulated in any manner. Since the car2X signal 18 transmits the data packets 43 from all modes 3, 5, 8 involved in the car2X network 1, it is possible for the car2X signal 18 to carry not only the data packets 43 from the accident vehicle 8 that are used to report the road accident 10 but also data packets 43 from nodes 3, 5, 8 that may be situated closer to the vehicle 3 that is not involved in the accident 10. It is subsequently intended to be assumed that one of the sets of traffic lights 5 is situated closer to the vehicle 3 that is not involved in the accident 10 than the accident vehicle 8, even though FIG. 1 shows a different scenario. As can be seen from FIG. 5, such a node 5 situated closer to the vehicle 3 than the accident vehicle 8 can be identified from the fact that its data packets 43 are transmitted at a signal strength 52 that is much greater than the signal strength 52 of the data packets 43 from the accident vehicle 8.

At this juncture, the first initial filter 47 can be used to produce an effect and to filter from the car2X signal 18 only the data packets 43 whose signal strength 52 is below a certain maximum signal strength 54. To this end, the first initial filter 47 can initially filter the car2X signal 18, for example, such that the data packets 43 from the node 5 situated closer to the vehicle 3 that is not involved in the accident 10 are filtered out in the initially filtered car2X signal 49, so that they do not reach the message generation device 39 in the first place and hence also can no longer be involved in the decision about forwarding. The thinking behind this is that the vehicle 3 that is not involved in the accident 10 cannot achieve a valid range effect as a forwarding node 3 for message sources situated in the vicinity for car2X messages 17, which means that most nodes in the car2X network 1 will obtain the forwarded car2X message 17' redundantly and would then also need to unpack it unnecessarily. Therefore, only car2X messages 17 and hence data packets 43 should be forwarded by message sources that are at a predetermined distance from the forwarding node 3, this being able to be identified most easily from the reception field strength or from the signal strength 52 of the car2X signal 18 at reception.

Figure 6:
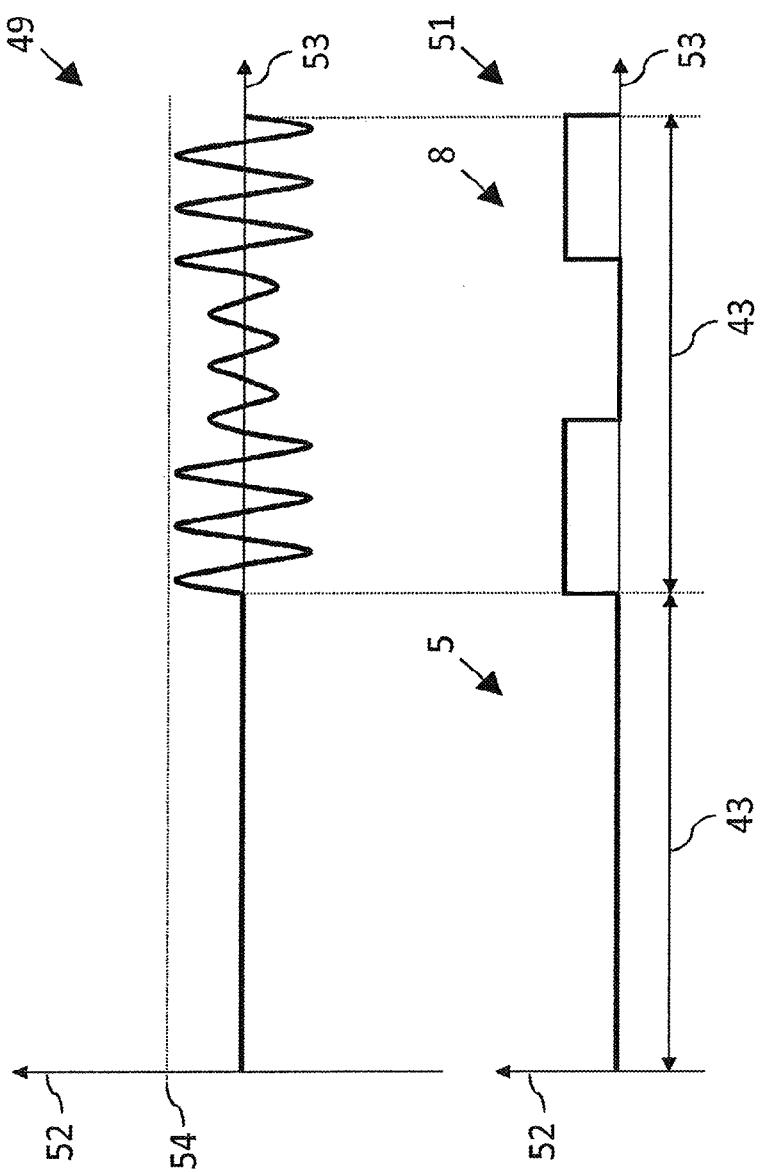
FIG. 6 shows a basic illustration of filtered signals that have been received from the vehicle ad hoc network from FIG. 3, FIGS. 7a and 7b show a basic illustration of data packets that have been filtered from a signal received via the vehicle ad hoc network from FIG. 3, FIGS. 8a and 8b show a basic illustration of a transmission signal in the car2X network 1 from FIG. 3 in two different channel utilisation states.

The second initial filter 48 could then subsequently filter the data packets 43 filtered from the initially filtered car2X signal 49 once again, in a manner that is not shown, on the basis of a further maximum signal strength, and the second initial filter ought then to know the signal strength 52 of the car2X signal 18 for each data packet 43. In this case, the maximum signal strength 54 in FIGS. 5 and 6 could be chosen such that the number of data packets 43 arising from the filtered car2X signal 49 is still higher than a desired throughput of data packets 43 that is able to be processed by the available computation resources, for example. Only with the further maximum signal strength in the second initial filter 48 could the number of filtered data packets 50 be matched to the desired throughput, so that, by way of example, the necessary computation power matches the available computation power. In this case, it would then also be possible to filter out the data packets 43 from the accident vehicle 8 if it is situated too close to the vehicle 3, for example. Expediently, the maximum signal strength 54 should be chosen to be greater than the further maximum signal strength, since otherwise the second initial filter 48 would be ineffective.

The filtering of the car2X signal 18 and/or of the data packets 43 on the basis of the maximum signal strengths 54, 55 has the effect that nodes 5, 8 in the car2X network 1 that are situated too close to a potential forwarding node are ignored for the forwarding of transmitted car2X messages 17, because the forwarding cannot achieve any significant range increase. In this case, the maximum signal strengths can be chosen on the basis of the desired throughput for the received data packets 43. In the aforementioned example, that is to say that the maximum signal strengths can be chosen to be of a corresponding level when there is little data traffic in the car2X network, and vice versa.

Such variable adjustment of the maximum field strengths will be explained in more detail below with reference to FIGS. 7a and 7b on the basis of the maximum field strength 54.

Fundamentally, the maximum field strength 54 can be adjusted on the basis of a statistical condition. This can be defined over a predetermined period 55 in which a determined number of received data packets 41.1 to 43.7 is considered. It goes without saying that the definition of the statistical condition could also involve consideration of the filtered data packets 49 downstream of the first initial filter 47.

The statistical condition for the maximum field strength 54 can now be defined in the form of a statistical quantile, for the purposes of which the maximum field strength 54 is chosen such that, of the considered data packets 41.1 to 43.7, only a determined shortfall component of these considered data packets 41.1 to 43.7 is taken into account downstream of the relevant initial filtering 47, 48. To this end, the quantile can be defined as a percentile 56, for example, for the purposes of which only a determined percentage of data packets 41.1 to 43.7 having the lowest signal strengths 52 continues to be used downstream of the initial filtering 47, 48. To illustrate this approach, the data packets 41.1 to 43.7 considered in the predetermined period 55 are shown in FIG. 7a in order of reception and in FIG. 7B in a manner sorted according to their signal strengths 52 at which the car2X signal 18 has been received.

Alternatively or additionally, the individual data packets 43 can be filtered and eliminated in the second initial filter 48 on the basis of their priority too. This initial filtering will be illustrated in more detail below with reference to FIGS. 8a and 8b, which show the channel load of the car2X network 1 on the basis of an exemplary car2X signal 18, as can be tapped off with the car2X antenna 19, in two different states of the car2X network 1.

In this regard, it should first of all be mentioned that car2X messages 17 should be packed and sent at the sender end fundamentally on the basis of the "first in first out" principle, which is called FIFO. This can be accomplished by using queues 57, for example, in which the data packet generation device 42 stores the data packets 43 produced from the car2X messages 17 and the modulation device 44 modulates the data packets 43 onto the car2X signal 18 on the basis of their order in which they have been placed into the queue 57.

If, as FIG. 8a shows, there are only a few free transmission slots 58 in the car2X signal 18, then it takes a correspondingly long time before the data packets 43 in the queue 57 have been handled and sent. The procedure is correspondingly faster if, as shown in FIG. 8b, there are correspondingly more free transmission slots 58. The higher the channel load in the car2X network 1, the fewer free transmission slots 58 there are available. Therefore, for a correspondingly high channel load, only data packets 43 having a correspondingly high priority should be put into the queue 57.

Although the elimination could be performed by message generation device 42, under the aforementioned technical constraints of having the filtering take place as early as possible, it should actually be the second initial filter 48 that decides whether a received data packet 43 having a car2X message 17 that potentially needs to be forwarded is actually unpacked and transferred to the message generation device 42. If a received data packet 43 itself already reveals that it carries a low-priority car2X message 17, then it should actually be eliminated in the second initial filter 48 if there are few free transmission slots 58 and hence if there is a high channel load.

Figure 9:
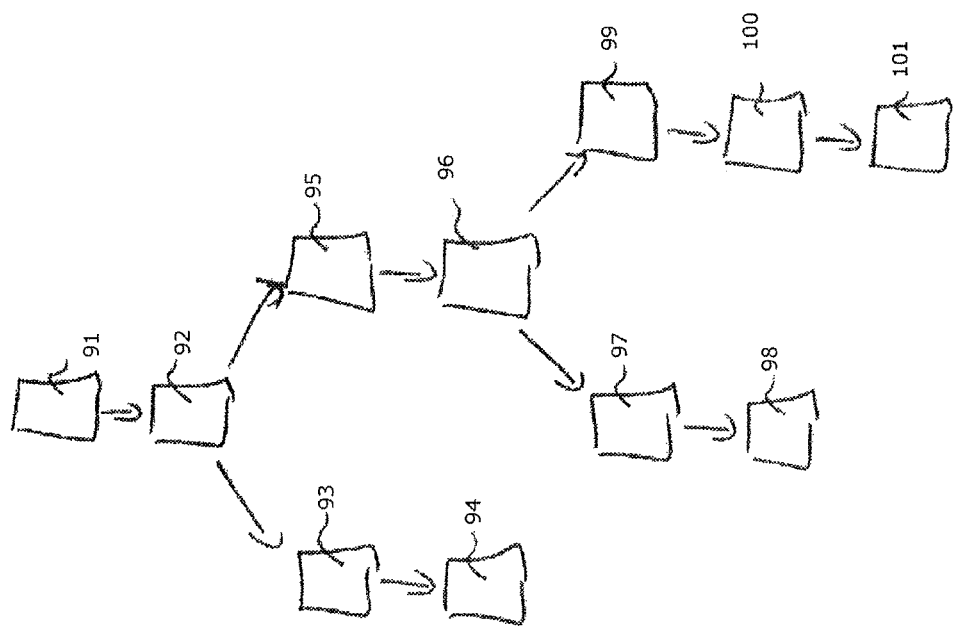
FIG. 9 shows an example of a possible sequence for the method according to the invention the form of a flowchart.

FIG. 9 shows an example of a possible sequence for the method according to the invention in the form of a flowchart. In method step 91, a vehicle-to-X communication system of a motor vehicle receives a vehicle-to-X message. The received vehicle-to-X message is what is known as a decentralised environmental notification message (DENM), the header of which prescribes an area of circulation for which the vehicle-to-X message is relevant and in which it accordingly needs to be processed further. The header additionally contains a piece of information about the priority of the vehicle-to-X message. This is flagged as low. In step 92, the reception field strength of the vehicle-to-X message at the antennas of the vehicle-to-X communication system is determined. If step 93 establishes that the reception field strength is above a firmly prescribed threshold, then step 94 decides not to forward the received vehicle-to-X message to the georouting method, since said message is sent by a sender in direct proximity to the receiving motor vehicle anyway. Additional forwarding of the vehicle-to-X message by the receiving motor vehicle therefore affords no advantages for the circulation of the vehicle-to-X message. However, if step 95 establishes that the reception field strength is below the firmly prescribed threshold, then step 96 that follows first of all determines the channel load of the communication channels that are used for transmission or available. By way of example, these are WLAN transmission channels based on IEEE 802.11p. If method step 97 additionally establishes that the channel load is too high to be able to ensure forwarding of the received vehicle-to-X message on the basis of the low priority thereof, then step 98 decides not to forward the received vehicle-to-X message to the georouting method. However, if step 99 establishes that the channel load is sufficiently low to be able to ensure forwarding of the received vehicle-to-X message on the basis of the low priority thereof, then said message is forwarded to the georouting method in step 100 and re-sent in step 101.

The further aspect of the invention can also be described by the following principles:

1. A selection method for reducing the computation complexity of a vehicle-to-X communication system, wherein the vehicle-to-X communication system is used to receive and/or send different types of vehicle-to-X messages, wherein at least one component of the received vehicle-to-X messages calls for forwarding by means of resending by the vehicle-to-X communication system, characterized in that the forwarding is effected on the basis of a determined need for forwarding and/or a determined opportunity for forwarding.

2. The method according to principle 1, characterized in that the need is determined according to a reception field strength at one or more antennas of the vehicle-to-X communication system.

3. The method according to principle 2,
characterized
in that a first threshold value for the reception field strength is used that, when exceeded, prevents the forwarding.

4. The method according to principle 3,
characterized
in that the first threshold value is firmly prescribed.

5. The method according to at least one of principles 3 and 4,
characterized
in that the first threshold value is determined on a situation-dependent basis.

6. The method according to principle 5,
characterized
in that the situation-dependent first threshold value is determined according to reception field strengths of all received vehicle-to-X messages over an alterable period.

7. The method according to at least one of principles 1 to 6,
characterized
in that the forwarding is prevented if the opportunity for forwarding is below a second threshold value.

8. The method according to at least one of principles 1 to 7,
characterized
in that the second threshold value is determined according to a priority of the vehicle-to-X messages.

9. The method according to at least one of principles 1 to 8,
characterized
in that the second threshold value is determined according to a channel load on communication channels used for transmission.

10. The method according to principle 9,
characterized
in that the channel load is simulated.

11. The method according to at least one of principles 1 to 10,
characterized
in that a vehicle-to-X message for which no necessity does not exceed the first threshold value and/or whose opportunity does not exceed the second threshold value is rejected before it is forwarded to a forwarding algorithm.

12. The method according to at least one of principles 1 to 11,
characterized
in that the vehicle-to-X communication system is associated with a motor vehicle.

The invention claimed is:

1. A method for forwarding a data packet, containing at least position data, that is carried in a transmission signal and received via a vehicle ad hoc network, the method comprising:
    filtering the received data packet on the basis of a predetermined filter condition; and
    forwarding the filtered data packet to a further receiver on the basis of an identification of whether the filtered data packet is intended to be forwarded to the further receiver,
    wherein the predetermined filter condition comprises a predetermined reception field strength at which the transmission signal carrying the data packet to be forwarded needs to be received,
    wherein the received data packet is filtered out if the transmission signal carrying the received data packet has a reception field strength that exceeds the predetermined reception field strength,
    wherein the data packet to be forwarded contains a message having a priority, wherein the predetermined filter condition comprises a predetermined priority for the priority of the message, and
    wherein the data packet to be forwarded is filtered if the priority of the message is lower than the predetermined priority.

2. The method as claimed in claim 1, wherein the predetermined reception field strength is dependent on a statistical condition that is determined on the basis of a number of data packets received over a predetermined period.

3. The method as claimed in claim 2, wherein the statistical condition is a determined quantile of data packets received in the transmission signal over the predetermined period.

4. A forwarding apparatus for performing a method as claimed in claim 1.

5. A transceiver for a vehicle for forwarding data packets that are sent in a transmission signal in a vehicle ad hoc network, comprising:
    an antenna for receiving the transmission signal, and
    a forwarding apparatus as claimed in claim 4 for forwarding at least some of the data packets from the transmission signal.

6. The method as claimed in claim 1, wherein the predetermined reception field strength is dependent on a statistical condition that is determined on the basis of a number of data packets received over a predetermined period.

* * * * *